(No Model.)

A. DEMUTH.
GLASS MOUTHPIECE FOR CIGARS AND CIGARETTES.

No. 246,474. Patented Aug. 30, 1881.

WITNESSES:
Donn P. Twitchell.
C. Sedgwick

INVENTOR:
A. Demuth
BY Munn & Co.
ATTORNEYS.

UNITED STATES PATENT OFFICE.

ADOLPH DEMUTH, OF BROOKLYN, N. Y.

GLASS MOUTH-PIECE FOR CIGARS AND CIGARETTES.

SPECIFICATION forming part of Letters Patent No. 246,474, dated August 30, 1881.

Application filed March 28, 1881. (No model.)

*To all whom it may concern:*

Be it known that I, ADOLPH DEMUTH, of Brooklyn, in the county of Kings and State of New York, have invented a new and useful Improvement in the Manufacture of Glass Mouth-Pieces for Cigars and Cigarettes, of which the following is a full, clear, and exact description.

Mouth-pieces or holders for cigars and cigarettes have heretofore been made from glass by a molding process, which leaves the articles thin at the mouth-place, where they are most liable to be broken.

The object of my improvement is to facilitate the manufacture of such glass mouth-pieces and produce them with an extra thickness of material at the mouth part, where most required.

The invention consists in a process of manufacture whereby the articles are made from glass tubes, as hereinafter set forth with reference to the accompanying drawings, which illustrate the different steps of the process.

Figure 1:
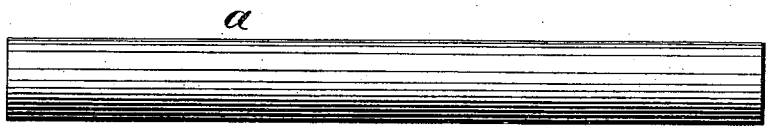
Figure 2:
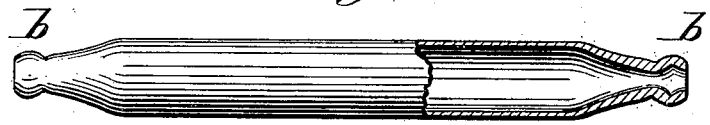
Figure 3:

I take tubes of glass (shown at *a* in Figure 1) of suitable diameter and slightly more than twice the length of the finished article. These tubes are melted at the ends, and while soft the ends are shaped with a suitable hand-tool to form a mouth-piece at each end, as shown at *b b* in Fig. 2. This pressing operation, by reduction in the size of the tube, thickens the material at this place, which, being the portion that is taken between the teeth of the user, is most liable to be broken, and therefore requires to be made stronger than the body of the tube. The tube, with the mouth-piece *b* at each end, is next separated by cutting or melting at its mid-length, and the end of each piece finished in the usual form. The finished holder (shown in Fig. 3) may be of any desired length.

By this process these glass holders can be made rapidly, and they possess, when finished, more metal and greater strength at the curves and angles of the mouth portion than the glass holders as ordinarily made.

Having thus described my invention, I claim as new and desire to secure by Letters Patent—

1. The hereinbefore-described process for the manufacture of glass mouth-pieces or holders for cigars and cigarettes, which consists in simultaneously shaping and thickening by compression the end of the tube while heated, as specified.

2. As an improved article of manufacture, a cigar or cigarette holder of glass, made thicker and stronger at the mouth portion than in the body, as shown and described.

ADOLPH DEMUTH.

Witnesses:
GEO. D. WALKER,
C. SEDGWICK.